United States Patent
Toda

(10) Patent No.: US 6,693,509 B2
(45) Date of Patent: Feb. 17, 2004

(54) CODING AND DECODING SYSTEM FOR WIRELESS TELECOMMUNICATION

(76) Inventor: Kohji Toda, 1-49-18 Futaba, Yokosuka 239-0814 (JP)

(*) Notice: Subject to any disclaimer, the term of this patent is extended or adjusted under 35 U.S.C. 154(b) by 487 days.

(21) Appl. No.: 09/801,143

(22) Filed: Mar. 6, 2001

(65) Prior Publication Data

US 2002/0125995 A1 Sep. 12, 2002

(51) Int. Cl.⁷ .................................................. H04Q 1/00
(52) U.S. Cl. ...................... 340/5.64; 340/5.66; 340/5.8; 340/310.03; 310/311; 310/313 R; 310/313 B; 310/313 D; 310/316.01; 310/323.06
(58) Field of Search ................................ 340/5.64, 5.66, 340/5.8, 310.03; 310/311, 313 R, 313 B, 313 D, 316.01, 318, 323.06; 367/180

(56) References Cited

U.S. PATENT DOCUMENTS 5,815,055 A * 9/1998 Eguchi et al. ............. 333/193
6,121,892 A * 9/2000 Reindl et al. ............. 340/5.8

* cited by examiner

*Primary Examiner*—Michael Horabik
*Assistant Examiner*—Yves Dalencourt

(57) ABSTRACT

A coding and decoding system for wireless telecommunication comprises a wireless telecommunication device and a personal card. The wireless telecommunication device consists of a first piezoelectric substrate, a coded IDT, a first electrode-group, a first amplifier, an antenna, a second amplifier, a second electrode-group, a first intermediary IDT, and a signal analyzer. The personal card attached to the wireless telecommunication device consists of a second piezoelectric substrate, a personal coded IDT, a third electrode-group, a second intermediary IDT. The coding and decoding system for wireless telecommunication has four sections, that is, (1) a personal transmitting section (2) a main transmitting section (3) a personal receiving section and (4) a main receiving section.

8 Claims, 8 Drawing Sheets

CODING AND DECODING SYSTEM FOR WIRELESS TELECOMMUNICATION

BACKGROUND OF THE INVENTION

1. Field of the Invention

The present invention relates to a coding and decoding system for wireless telecommunication by means of using a wireless telecommunication device and a personal card attached thereto.

2. Description of the Prior Art

According to the increase in commerce on wireless telecommunication, consumers are apt to be gotten into trouble. Using coding techniques on wireless telecommunication prevents the influence of noises and invaders. However, it is difficult to keep the communication secret by the coding technique based on conventional hard-wears such as magnetic cards and IC cards. The magnetic cards are very convenient and popular, however it is easy to make copies thereof or steal passwords. Therefore, damages by unlawful using of credit cards, cash cards, prepaid cards, and so on are increasing year after year. The IC cards are superior to the magnetic cards in difficulty in counterfeiting of cards, however it is not enough to keep the communication secret thoroughly. Thus, conventional hard-wears have problems on keeping a communication security.

SUMMARY OF THE INVENTION

An object of the present invention is to provide a personal card useful as credit card, cash card, key, and others.

Another object of the present invention is to provide a personal card excellent in difficulty in counterfeiting and stealing of passwords.

Another object of the present invention is to provide a coding and decoding system for wireless telecommunication capable of recognizing the personal-card singularity in secret.

Another object of the present invention is to provide a coding and decoding system for wireless telecommunication capable of keeping a network communication secret.

Another object of the present invention is to provide a coding and decoding system for wireless telecommunication capable of low electric power consumption.

Another object of the present invention is to provide a coding and decoding system for wireless telecommunication excellent in durability and manufacturing.

A still other object of the present invention is to provide a coding and decoding system for wireless telecommunication having a small size and a simple structure.

According to one aspect of the present invention there is provided a coding and decoding system for wireless telecommunication comprising a wireless telecommunication device and a personal card attached thereto. The wireless telecommunication device consists of a first piezoelectric substrate, a coded IDT, a first electrode-group, a first amplifier, an antenna, a second amplifier, a second electrode-group, a first intermediary IDT, and a signal analyzer. The personal card consists of a second piezoelectric substrate, a personal coded IDT, a third electrode-group, a second intermediary IDT. The coded IDT consists of interdigital electrode pairs $P_i$ ($i=1, 2, \ldots, n$), of which two neighbors are at a distance L from each other, and having a coded pattern. The first electrode-group consists of an interdigital electrode $A_0$ and an interdigital electrode $A_i$ ($i=1$) at a distance $iL$ ($i=1$) from the interdigital electrode $A_0$. The second electrode-group consists of a central interdigital electrode $B_0$, a right interdigital electrode $B_{-1}$ at a distance $L_0$ from the central interdigital electrode $B_0$, and a left interdigital electrode $B_i$ ($i=1$) at a distance $L_0+iL$ ($i=1$) from the central interdigital electrode $B_0$. The personal coded IDT includes the interdigital electrode pairs $P_i$, and has a personal coded pattern. The third electrode-group consists of an interdigital electrode $C_0$ and an interdigital electrode $C_i$ ($i=1$) at the distance $iL$ ($i=1$) from the interdigital electrode $C_0$.

The coding and decoding system for wireless telecommunication has four sections, that is, (1) a personal transmitting section composed of the second piezoelectric substrate, the personal coded IDT, the third electrode-group, the first amplifier, and the antenna; (2) a main transmitting section composed of the first piezoelectric substrate, the coded IDT, the first electrode-group, the first amplifier, and the antenna; (3) a personal receiving section composed of the antenna, the second amplifier, the first piezoelectric substrate, the second electrode-group, the second piezoelectric substrate, the second intermediary IDT, the personal coded IDT, and the signal analyzer; and (4) a main receiving section composed of the antenna, the second amplifier, the first piezoelectric substrate, the second electrode-group, the first intermediary IDT, the coded IDT, and the signal analyzer.

In the personal transmitting section, when a pulse (1) is applied to the personal coded IDT, a personal coded SAW corresponding to the personal coded pattern is excited on the second piezoelectric substrate. The personal coded SAW is detected as a personal coded burst-signal at the interdigital electrode $C_0$, and after a time corresponding to the distance L, at the interdigital electrode $C_1$ again. The personal coded burst-signals at interdigital electrodes $C_0$ and $C_1$ form a personal double-coded burst-signal, which is emitted from the antenna via the first amplifier.

In the main transmitting section, when a transmitting-message digital-signal is applied to the coded IDT, a coded SAW is excited on the first piezoelectric substrate. The coded SAW corresponding to the coded pattern is detected as a coded burst-signal at the interdigital electrode $A_0$, and after a time corresponding to the distance L, at the interdigital electrode $A_1$ again. The coded burst-signals at the interdigital electrodes $A_0$ and $A_1$ form a double-coded burst-signal, which is emitted from the antenna via the first amplifier.

In the personal receiving section, if a private double-coded burst-signal is caught at the antenna, it is applied to right interdigital electrode $B_{-1}$ and left interdigital electrode $B_1$, respectively, via the second amplifier. In this time, first- and second SAWs are excited on the first piezoelectric substrate, respectively. The first SAW arrives at the central interdigital electrode $B_0$ by a time corresponding to the distance L before the second SAW arrives at the central interdigital electrode $B_0$. As a result, the private double-coded burst-signal is converted into a private mono-coded burst-signal at the central interdigital electrode $B_0$. When the private mono-coded burst-signal is applied to the second intermediary IDT 16, a private mono-coded SAW along the reverse direction to the personal coded SAW in the personal transmitting section is excited on the second piezoelectric substrate. If the private mono-coded SAW correlates to the personal coded pattern, a private decoded pulse is detected at the personal coded IDT. The private decoded pulse is received at the signal analyzer.

In the main receiving section, if a receiving-message double-coded burst-signal is caught at the antenna, it is applied to right interdigital electrode $B_{-1}$ and left interdigital electrode $B_1$, respectively, via the second amplifier. In this time, third- and fourth SAWs are excited on the first piezoelectric substrate, respectively. The third SAW arrives at the central interdigital electrode $B_0$ by a time corresponding to the distance L before the fourth SAW arrives at the central interdigital electrode $B_0$. As a result, the receiving-message double-coded burst-signal is converted into a receiving-message mono-coded burst-signal at the central interdigital electrode $B_0$. When the receiving-message mono-coded burst-signal is applied to the first intermediary IDT, a mono-coded SAW along the reverse direction to the coded SAW in the main transmitting section is excited on the first piezoelectric substrate. If the mono-coded SAW correlates to the coded pattern, a decoded pulse is detected at the coded IDT. The decoded pulse is received at the signal analyzer.

According to another aspect of the present invention there is provided a coded IDT consisting of at least three interdigital electrode pairs.

According to another aspect of the present invention there is provided a personal coded IDT comprising a row of multiple times four blocks, of which at least one has the same construction as the coded IDT and all the others have no-electrode-pair constructions with the same outward size as the coded IDT.

According to other aspect of the present invention there are provided first-, second-, and third electrode-groups. The first electrode-group includes at least two interdigital electrodes $A_i$ {i=1, 2, ..., (n−1)} at a distance iL {i=1, 2, ..., (n−1)}, respectively, from the interdigital electrode $A_0$. The second electrode-group includes at least two left interdigital electrodes $B_i$ {i=1, 2, ..., (n−1)} at a distance $L_0$+iL {i=1, 2, ..., (n−1)}, respectively, from the central interdigital electrode $B_0$. The third electrode-group includes at least two interdigital electrodes $C_i$ {i=1, 2, ..., (n−1)} at a distance iL {i=1, 2, ..., (n−1)}, respectively, from the interdigital electrode $C_0$.

According to a further aspect of the present invention there are provided a bipolar-pulse generator, and first- and second coded IDTs in place of the coded IDT.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
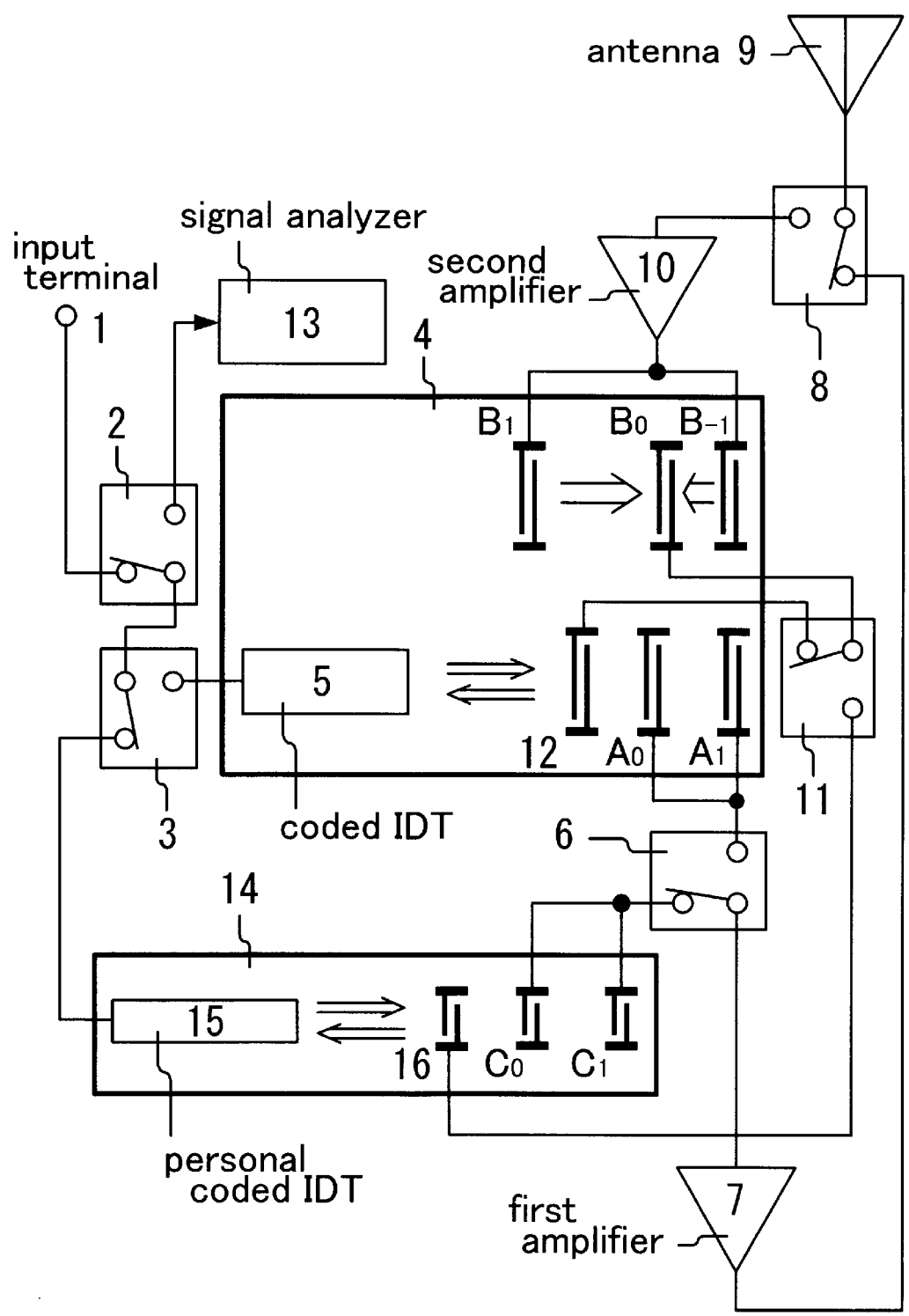
FIG. 1 shows a schematic illustration of a coding and decoding system for wireless telecommunication according to a first embodiment of the present invention.

FIG. 1 shows a schematic illustration of a coding and decoding system for wireless telecommunication according to a first embodiment of the present invention. The coding and decoding system for wireless telecommunication comprises a wireless telecommunication device and a personal card attached thereto. The wireless telecommunication device comprises input terminal 1, switches 2 and 3, first piezoelectric substrate 4, coded IDT 5, switch 6, first amplifier 7, switch 8, antenna 9, second amplifier 10, switch 11, first intermediary IDT 12, signal analyzer 13, and first-, and second electrode-groups. The personal card comprises second piezoelectric substrate 14, personal coded IDT 15, second intermediary IDT 16, and a third electrode-group. The first electrode-group consists of interdigital electrode $A_0$ and interdigital electrode $A_1$, which is at a distance iL (i=1) from interdigital electrode $A_0$. The second electrode-group consists of central interdigital electrode $B_0$, left interdigital electrode $B_1$, and right interdigital electrode $B_{-1}$. Right interdigital electrode $B_{-1}$ is at a distance $L_0$ from central interdigital electrode $B_0$, and left interdigital electrode $B_1$ is at a distance $L_0$+iL (i=1) from central interdigital electrode $B_0$. The third electrode-group consists of interdigital electrode $C_0$ and interdigital electrode $C_1$, which is at the distance iL from interdigital electrode $C_0$. First-, and second electrode-groups, and first intermediary IDT 12, made of aluminum thin films, are formed on first piezoelectric substrate 4, and have an interdigital periodicity of 40 μm, respectively. The third electrode-group and second intermediary IDT 16, made of aluminum thin films, are formed on second piezoelectric substrate 14, and have an interdigital periodicity of 40 μm, respectively. First piezoelectric substrate 4 and second piezoelectric substrate 14 are made of a piezoelectric ceramic thin plate with a dimension of 200 μm in thickness, respectively. Thus, the coding and decoding system for wireless telecommunication in FIG. 1 has a small size and a simple structure, and is excellent in durability and manufacturing.

Figure 2:
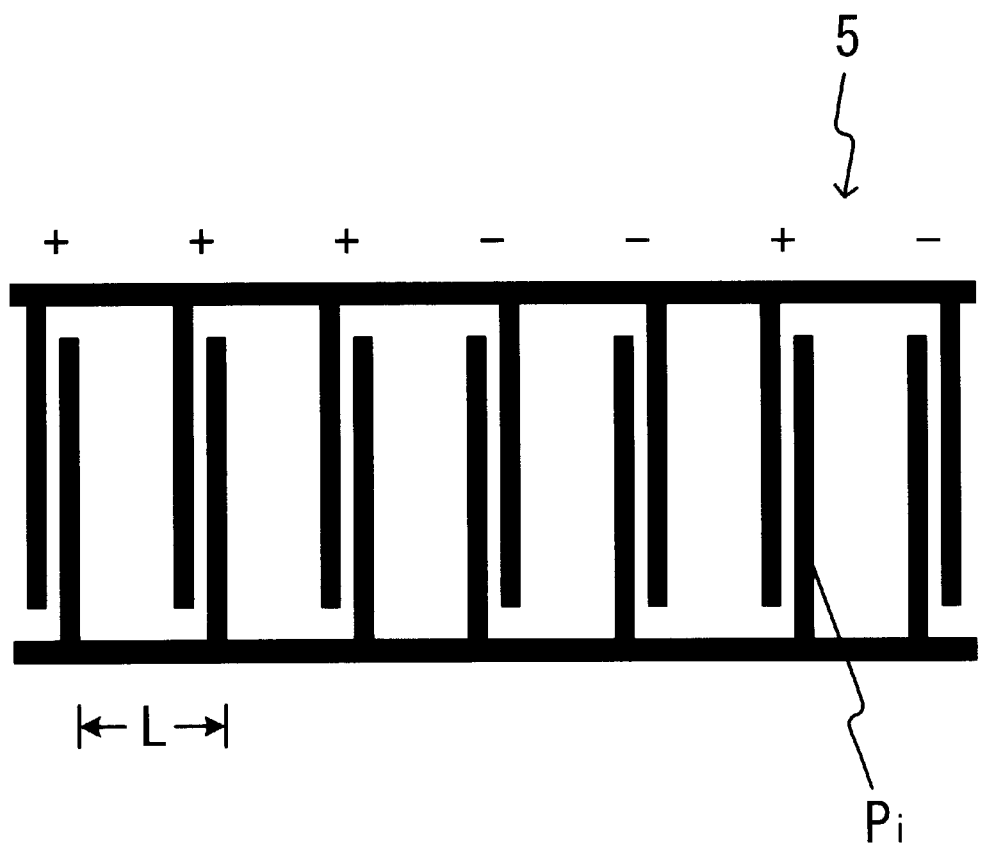
FIG. 2 shows a plan view of coded IDT 5.

FIG. 2 shows a plan view of coded IDT 5 consisting of seven interdigital electrode pairs $P_i$ (i=1, 2, 3, 4, 5, 6 and 7), of which two neighbors are at a distance L from each other. Each pair has an interdigital periodicity of 40 μm. Coded IDT 5 has a coded pattern based on the Baker code. Besides a seven-digits code (1, 1, 1, 0, 0, 1, 0) in FIG. 2, a three-digits code (1, 1, 0), a seven-digits code (1, 1, 1, 0, 0, 1, 0), and others are available.

Figure 3:
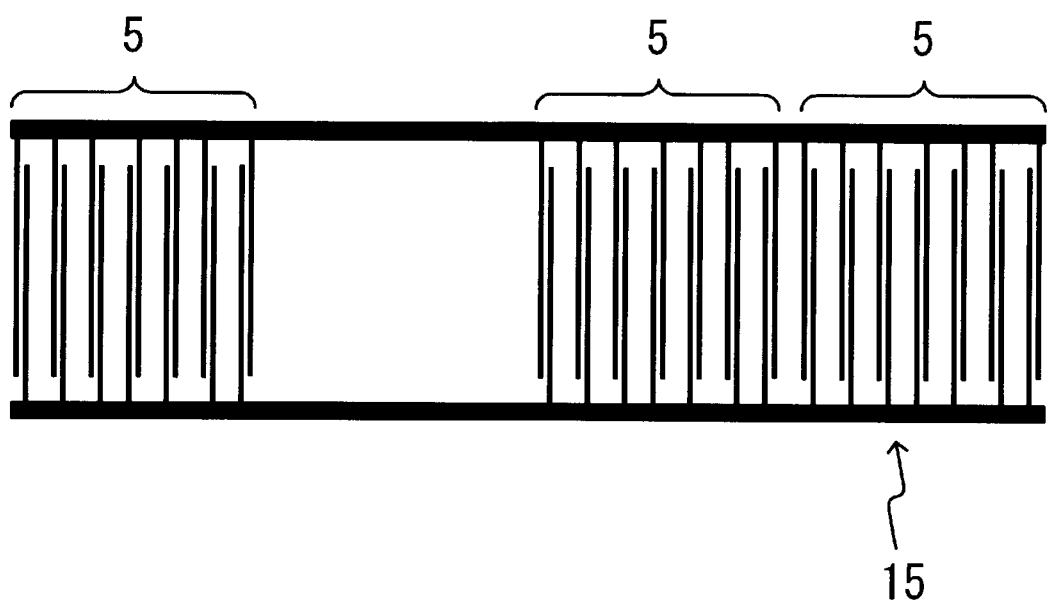
FIG. 3 shows a plan view of personal coded IDT 15.

FIG. 3 shows a plan view of personal coded IDT 15. Personal coded IDT 15 comprises a row of four blocks, of which three have the same constructions as coded IDT 5 and the rest has no-electrode-pair construction, that is, a null zone with the same outward size as coded IDT 5. Thus, personal coded IDT 15 has a personal coded pattern including 21 interdigital electrode pairs.

The coding and decoding system for wireless telecommunication in FIG. 1 has four sections, that is, (1) a personal transmitting section composed of input terminal 1, switches 2 and 3, second piezoelectric substrate 14, personal coded IDT 15, the third electrode-group, switch 6, first amplifier 7, switch 8, and antenna 9; (2) a main transmitting section composed of input terminal 1, switches 2 and 3, first piezoelectric substrate 4, coded IDT 5, the first electrode-group, switch 6, first amplifier 7, switch 8, and antenna 9; (3) a personal receiving section composed of antenna 9, switch 8, second amplifier 10, first piezoelectric substrate 4, the second electrode-group, switch 11, second piezoelectric substrate 14, second intermediary IDT 16, personal coded IDT 15, switches 3 and 2, and signal analyzer 13; and (4) a main receiving section composed of antenna 9, switch 8, second amplifier 10, first piezoelectric substrate 4, the second electrode-group, switch 11, first intermediary IDT 12, coded IDT 5, switches 3 and 2, and signal analyzer 13.

In the personal transmitting section, when a pulse (1) is applied to personal coded IDT 15 from input terminal 1 via switches 2 and 3, a personal coded SAW, having 21 burst waves and corresponding to the personal coded pattern, is excited on second piezoelectric substrate 14. The personal coded SAW is detected as a personal coded burst-signal at interdigital electrode $C_0$, and after a time corresponding to the distance L, at interdigital electrode $C_1$ again. The personal coded burst-signals at interdigital electrodes $C_0$ and $C_1$ form a personal double-coded burst-signal, which arrives at first amplifier 7 via switch 6, and is emitted from antenna 9 via switch 8.

In the main transmitting section, when a pulse (1) of a transmitting-message digital-signal composed of a row of pulses (0 and 1) is applied to coded IDT 5 from input terminal 1 via switches 2 and 3, a coded SAW based on the pulse (1) is excited on first piezoelectric substrate 4. The coded SAW corresponding to the coded pattern is detected as a coded burst-signal at interdigital electrode $A_0$, and after a time corresponding to the distance L, at interdigital electrode $A_1$ again. The coded burst-signals at interdigital electrodes $A_0$ and $A_1$ form a double-coded burst-signal composed of a row of eight bursts, of which each is made from one burst at interdigital electrode $A_0$ and the previous burst at interdigital electrode $A_1$. For example, a third burst of the row is based on a third burst at interdigital electrode $A_0$ and a second burst at interdigital electrode $A_1$. The double-coded burst-signal arrives at first amplifier 7 via switch 6, and is emitted from antenna 9 via switch 8. On the other hand, the pulse (0) of the transmitting message digital-signal makes no coded SAW on first piezoelectric substrate 4. As a result, the transmitting-message digital-signal is converted into a transmitting-message double-coded burst-signal including no-bursts periods corresponding to the pulses (0).

In the personal receiving section, if a private double-coded burst-signal is caught at antenna 9, it arrives at second amplifier 10 via switch 8. And then, it is applied to right interdigital electrode $B_{-1}$ and left interdigital electrode $B_1$, respectively. In this time, first- and second SAWs are excited on first piezoelectric substrate 4, respectively. The first SAW arrives at central interdigital electrode $B_0$ by a time corresponding to the distance L before the second SAW arrives at central interdigital electrode $B_0$. Therefore, one burst wave of the first SAW and the previous burst wave of the second SAW arrive at central interdigital electrode $B_0$ simultaneously. As a result, the private double-coded burst-signal is converted into a private mono-coded burst-signal at central interdigital electrode $B_0$. Thus, a first step of a signal decoding is achieved. The private mono-coded burst-signal is applied to second intermediary IDT 16 via switch 11. And then, a private mono-coded SAW along the reverse direction to the personal coded SAW in the personal transmitting section is excited on second piezoelectric substrate 14. If the private mono-coded SAW correlates to the personal coded pattern, a private decoded pulse is detected at personal coded IDT 15. Thus, a second step of the signal decoding is achieved. In other words, only when the private mono-coded burst-signal is equivalent to the personal coded burst-signal in the personal transmitting section, the private decoded pulse appears at personal coded IDT 15. Thus, personal coded IDT 15 acts as a call switch. The private decoded pulse is received at signal analyzer 13 via switches 3 and 2 without the influence of noises and invaders.

In the main receiving section, if a receiving-message double-coded burst-signal, which is composed of rows of double-coded bursts and no-bursts periods, is caught at antenna 9, it arrives at second amplifier 10 via switch 8, and then, each row of double-coded bursts is applied to right interdigital electrode $B_{-1}$ and left interdigital electrode $B_1$, respectively. In this time, third- and fourth SAWs are excited on first piezoelectric substrate 4, respectively. The third SAW arrives at central interdigital electrode $B_0$ by a time corresponding to the distance L before the fourth SAW arrives at central interdigital electrode $B_0$. As a result, the row of double-coded bursts is converted into a row of mono-coded bursts at central interdigital electrode $B_0$. On the other hand, each no-bursts period makes no SAW on first piezoelectric substrate 4. Thus, the receiving-message double-coded burst-signal is converted into a receiving-message mono-coded burst-signal at central interdigital electrode $B_0$. When the row of mono-coded bursts is applied to first intermediary IDT 12 via switch 11, a mono-coded SAW along the reverse direction to the coded SAW in the main transmitting section is excited on first piezoelectric substrate 4. If the mono-coded SAW correlates to the coded pattern, a decoded pulse is detected at coded IDT 5. In short, only when the row of mono-coded bursts is equivalent to the coded burst-signal in the main transmitting section, the decoded pulse appears at coded IDT 5. The decoded pulse is received at signal analyzer 13 via switches 3 and 2 without the influence of noises and invaders. As a result, the receiving-message mono-coded burst-signal is converted into a receiving-message burst-signal at signal analyzer 13.

Figure 4:
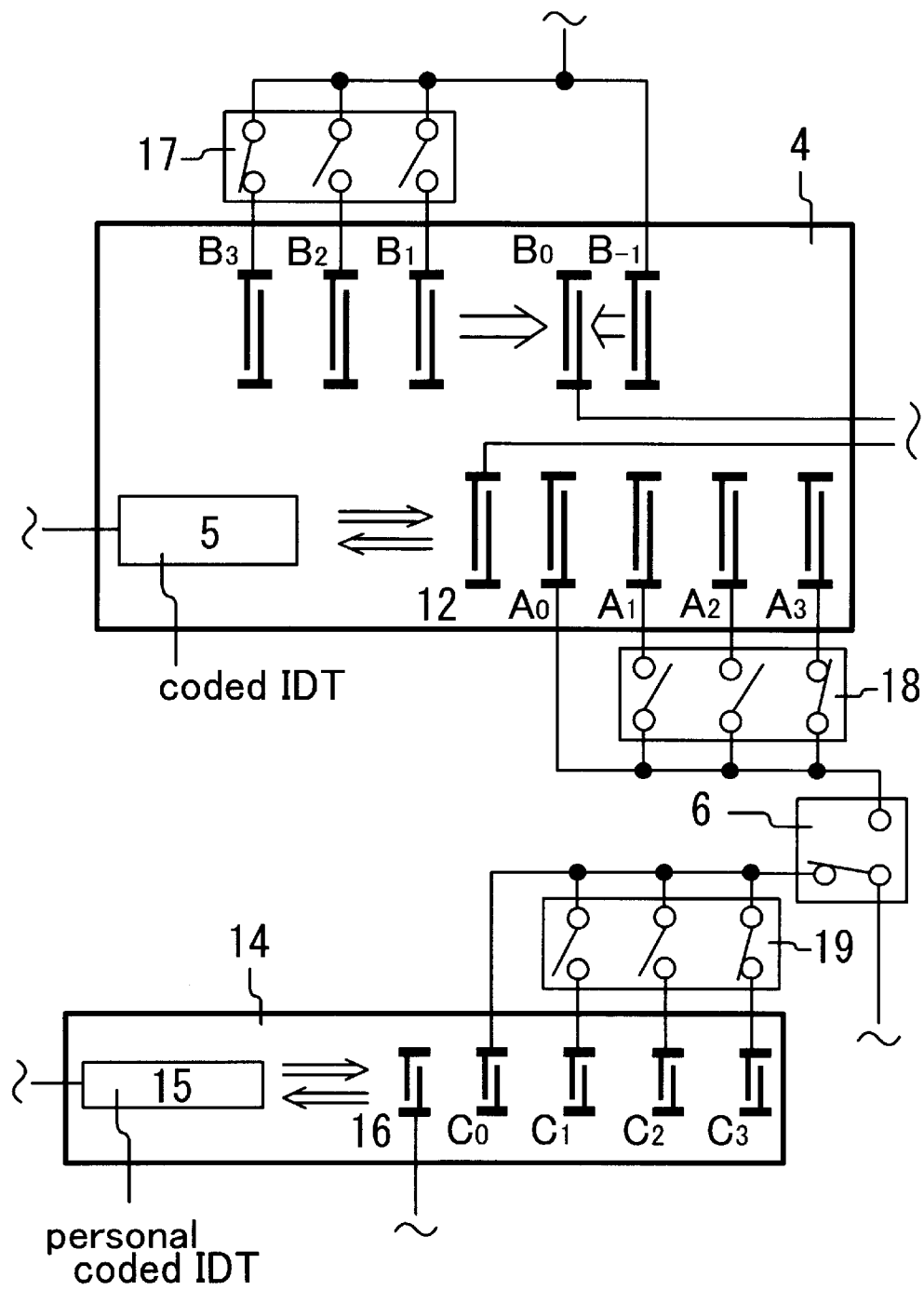
FIG. 4 shows a fragmentary schematic illustration of a coding and decoding system for wireless telecommunication according to a second embodiment of the present invention.

FIG. 4 shows a fragmentary schematic illustration of a coding and decoding system for wireless telecommunication according to a second embodiment of the present invention. The coding and decoding system for wireless telecommunication in FIG. 4 has the same construction as FIG. 1, except for further comprising switches 17, 18 and 19, interdigital electrodes $A_2$ and $A_3$, which are included in the first electrode-group, left interdigital electrodes $B_2$ and $B_3$, which are included in the second electrode-group, and interdigital electrodes $C_2$ and $C_3$, which are included in the third electrode-group. Input terminal 1, switches 2 and 3, first amplifier 7, switch 8, antenna 9, second amplifier 10, and switch 11 are not drawn in FIG. 4. A distance between interdigital electrodes $A_1$ and $A_2$, and that between interdigital electrodes $A_2$ and $A_3$ are the same as the distance L. Interdigital electrodes $A_2$ and $A_3$ have an interdigital periodicity of 40 $\mu$m, respectively. A distance between right interdigital electrodes $B_1$ and $B_2$, and that between right interdigital electrodes $B_2$ and $B_3$ are the same as the distance L. A distance between central interdigital electrode $B_0$ and left interdigital electrode $B_2$ is $L_0+2L$, and that between central interdigital electrode $B_0$ and left interdigital electrode $B_3$ is $L_0+3L$. Left interdigital electrodes $B_2$ and $B_3$ have an interdigital periodicity of 40 $\mu$m, respectively.

The coding and decoding system for wireless telecommunication in FIG. 4 has four sections with the same constructions as FIG. 1, except that (1) switch 17 belongs to both the personal- and main receiving sections; and (2) switches 18 and 19 belong to the main transmitting section and the personal transmitting section, respectively.

In the personal transmitting section in FIG. 4, when a pulse (1) is applied to personal coded IDT 15 from input terminal 1 via switches 2 and 3, a personal coded SAW is excited on second piezoelectric substrate 14. The personal coded SAW is detected as a personal coded burst-signal at interdigital electrode $C_0$, and after a time corresponding to the distances L, 2L and 3L, at interdigital electrodes $C_1$, $C_2$ and $C_3$, respectively. Using switch 19 selects one of interdigital electrodes $C_1$, $C_2$ and $C_3$. Thus, the personal coded burst-signal at interdigital electrodes $C_0$ and that at one of interdigital electrodes $C_1$, $C_2$ and $C_3$ form a personal double-coded burst-signal. The personal double-coded burst-signal arrives at first amplifier 7 via switch 6, and is emitted from antenna 9 via switch 8 in the same way as FIG. 1.

In the main transmitting section in FIG. 4, when a pulse (1) of a transmitting-message digital-signal composed of a row of pulses (0 and 1) is applied to coded IDT 5 from input terminal 1 via switches 2 and 3, a coded SAW based on the pulse (1) is excited on first piezoelectric substrate 4. The coded SAW is detected as a coded burst-signal at interdigital electrode $A_0$, and after a time corresponding to the distances L, 2L and 3L, at interdigital electrodes $A_1$, $A_2$ and $A_3$, respectively. Using switch 18 selects one of interdigital electrodes $A_1$, $A_2$ and $A_3$. Thus, the coded burst-signal at interdigital electrodes $A_0$ and that at one of interdigital electrodes $A_1$, $A_2$ and $A_3$ form a double-coded burst-signal composed of a row of bursts, of which each is made from an (n)th burst at interdigital electrode $A_0$, and an (n−1)th burst at interdigital electrode $A_1$, or an (n−2)th burst at interdigital electrode $A_2$, or an (n−3)th burst at interdigital electrode $A_3$. For example, a sixth burst of the row is based on a sixth burst at interdigital electrode $A_0$ and a third burst at interdigital electrode $A_3$. Thus the double-coded burst-signal is composed of a row of eight, nine or ten bursts in all. The double-coded burst-signal arrives at first amplifier 7 via switch 6, and is emitted from antenna 9 via switch 8 in the same way as FIG. 1. On the other hand, the pulse (0) of the transmitting message digital-signal makes no coded SAW on first piezoelectric substrate 4. As a result, the transmitting-message digital-signal is converted into a transmitting-message double-coded burst-signal including no-bursts periods corresponding to the pulses (0).

In the personal receiving section in FIG. 4, if a private double-coded burst-signal is caught at antenna 9, and then, arrives at second amplifier 10 via switch 8 in the same way as FIG. 1, it is applied to right interdigital electrode $B_{-1}$ and one of left interdigital electrodes $B_1$, $B_2$ and $B_3$ via switch 17. In this time, a first SAW is excited at right interdigital electrode $B_{-1}$, and a second SAW is excited at one of left interdigital electrodes $B_1$, $B_2$ and $B_3$ on first piezoelectric substrate 4. Central interdigital electrode $B_0$ receives the first SAW, and after a time corresponding to the distance L, 2L or 3L the second SAW. Therefore, at the same time that an (n)th burst wave of the first SAW arrives at central interdigital electrode $B_0$, an (n−1)th burst wave of the second SAW at left interdigital electrode $B_1$, or an (n−2)th burst wave of the second SAW at left interdigital electrode $B_2$, or an (n−3)th burst wave of the second SAW at left interdigital electrode $B_3$ consequently arrives at central interdigital electrode $B_0$. For example, a fourth burst wave of the first SAW and a second burst wave of the second SAW at left interdigital electrode $B_2$ arrive at central interdigital electrode $B_0$ simultaneously. As a result, the private double-coded burst-signal is converted into a private mono-coded burst-signal at central interdigital electrode $B_0$. The private mono-coded burst-signal is applied to second intermediary IDT 16 via switch 11 in the same way as FIG. 1. And then, a private mono-coded SAW along the reverse direction to the personal coded SAW in the personal transmitting section in FIG. 4 is excited on second piezoelectric substrate 14. If the private mono-coded SAW correlates to the personal coded pattern, a private decoded pulse is detected at personal coded IDT 15. Thus, personal coded IDT 15 acts as a call switch. The private decoded pulse is received at signal analyzer 13 via switches 3 and 2 in the same way as FIG. 1.

In the main receiving section in FIG. 4, if a receiving-message double-coded burst-signal, which is composed of rows of double-coded bursts and no-bursts periods, is caught at antenna 9, it arrives at second amplifier 10 via switch 8 in the same way as FIG. 1, and then, each row of double-coded bursts is applied to right interdigital electrode $B_{-1}$ and one of left interdigital electrodes $B_1$, $B_2$ and $B_3$ via switch 17. In this time, a third SAW is excited at right interdigital electrode $B_{-1}$, and a fourth SAW is excited at one of left interdigital electrodes $B_1$, $B_2$ and $B_3$ on first piezoelectric substrate 4. Central interdigital electrode $B_0$ receives the third SAW, and after a time corresponding to the distance L, 2L or 3L the fourth SAW. Therefore, at the same time that an (n)th burst wave of the third SAW arrives at central interdigital electrode $B_0$, an (n−1)th burst wave of the fourth SAW at left interdigital electrode $B_1$, or an (n−2)th burst wave of the fourth SAW at left interdigital electrode $B_2$, or an (n−3)th burst wave of the fourth SAW at left interdigital electrode $B_3$ consequently arrives at central interdigital electrode $B_0$. As a result, the row of double-coded bursts is converted into a row of mono-coded bursts at central interdigital electrode $B_0$. On the other hand, each no-bursts period makes no SAW on first piezoelectric substrate 4. Thus, the receiving-message double-coded burst-signal is converted into a receiving-message mono-coded burst-signal at central interdigital electrode $B_0$. When the row of mono-coded bursts is applied to first intermediary IDT 12 via switch 11 in the same way as FIG. 1, a mono-coded SAW along the reverse direction to the coded SAW in the main transmitting section in FIG. 4 is excited on first piezoelectric substrate 4. If the mono-coded SAW correlates to the coded pattern, a decoded pulse is detected at coded IDT 5. The decoded pulse is received at signal analyzer 13 via switches 3 and 2 in the same way as FIG. 1. Thus, the receiving-message mono-coded burst-signal is converted into a receiving-message burst-signal.

Figure 5:
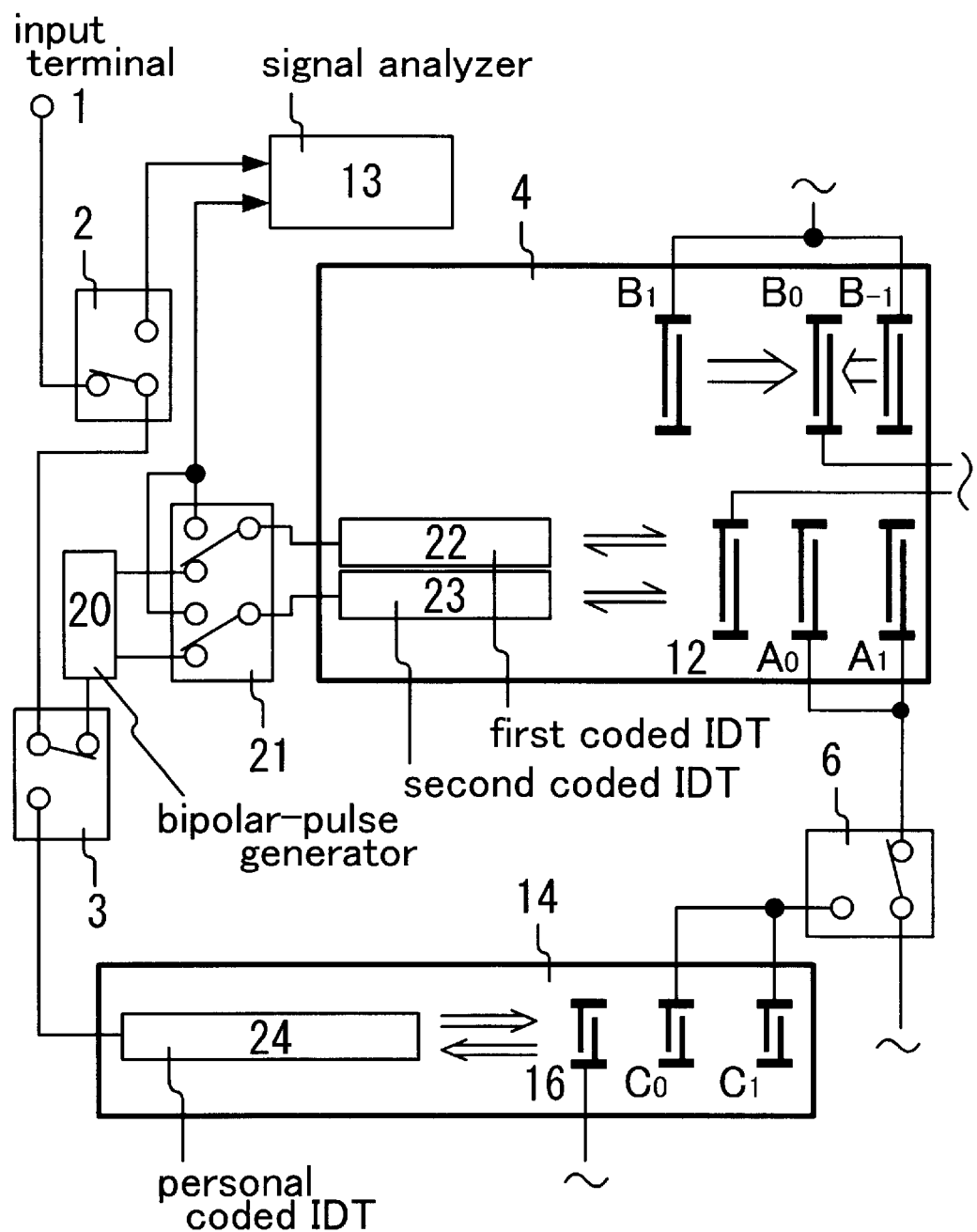
FIG. 5 shows a fragmentary schematic illustration of a coding and decoding system for wireless telecommunication according to a third embodiment of the present invention.

FIG. 5 shows a fragmentary schematic illustration of a coding and decoding system for wireless telecommunication according to a third embodiment of the present invention. The coding and decoding system for wireless telecommunication in FIG. 5 has the same construction as FIG. 1, except for using first coded IDT 22 and second coded IDT 23, which are in place of coded IDT 5, and personal coded IDT 24 in place of personal coded IDT 15, and further comprising bipolar-pulse generator 20, and switch 21. Amplifier 7, switch 8, antenna 9, second amplifier 10, and switch 11 are not drawn in FIG. 5.

Figure 6:
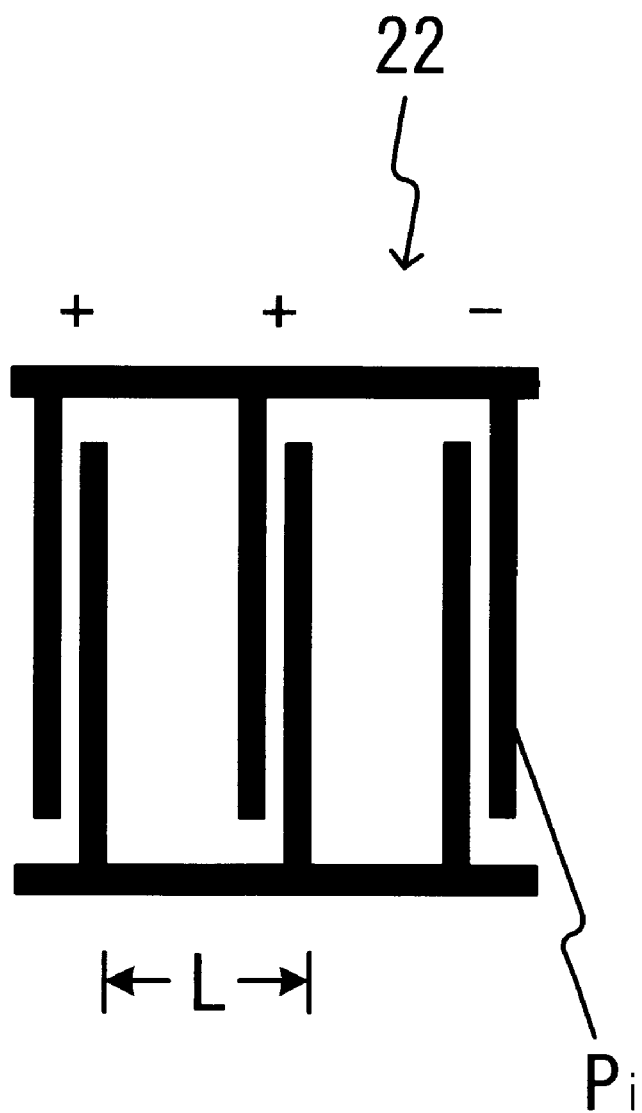
FIG. 6 shows a plan view of first coded IDT 22.

FIG. 6 shows a plan view of first coded IDT 22 consisting of three interdigital electrode pairs $P_i$ (i=1, 2 and 3), of which two neighbors are at a distance L from each other. Each pair has an interdigital periodicity of 40 $\mu$m. First coded IDT 22 has a first coded pattern based on the Baker code. Second coded IDT 23 has the same construction as first coded IDT 22 except for having the different coded pattern, that is, a second coded pattern.

Figure 7:
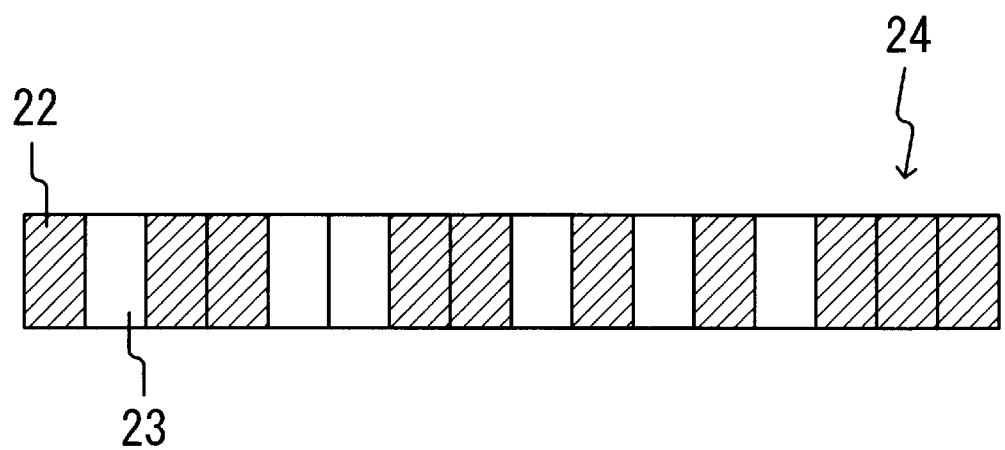
FIG. 7 shows a schematic illustration of personal coded IDT 24.

FIG. 7 shows a schematic illustration of personal coded IDT 24. Personal coded IDT 24 comprises a row of 16 blocks, of which ten have the same constructions as first coded IDT 22 and six have the same constructions as second coded IDT 23. Thus, personal coded IDT 24 has a personal coded pattern including 48 interdigital electrode pairs.

The coding and decoding system for wireless telecommunication in FIG. 5 has four sections with the same constructions as FIG. 1, except that (1) bipolar-pulse generator 20 belongs to the main transmitting section; (2) switch 21, first coded IDT 22, and second coded IDT 23 belong to both the main transmitting- and receiving sections; and (3) personal coded IDT 24 belongs to both the personal transmitting- and receiving sections.

In the personal transmitting section in FIG. 5, when a pulse (1) is applied to personal coded IDT 24 from input terminal 1 via switches 2 and 3, a personal coded SAW corresponding to the personal coded patter of personal coded IDT 24 is excited on second piezoelectric substrate 14. The personal coded SAW is detected as a personal coded burst-signal at interdigital electrode $C_0$, and after a time corresponding to the distance L, at interdigital electrode $C_1$ again. The personal coded burst-signals at interdigital electrodes $C_0$ and $C_1$ form a personal double-coded burst-signal. In this time, the personal double-coded burst-signal is composed of a row of 49 bursts, of which each is made from one burst at interdigital electrode $C_0$ and the previous burst at interdigital electrode $C_1$. For example, a third burst of the row is based on a third burst at interdigital electrode $C_0$ and a second burst at interdigital electrode $C_1$. The personal double-coded burst-signal arrives at first amplifier 7 via switch 6, and is emitted from antenna 9 via switch 8 in the same way as FIG. 1.

In the main transmitting section in FIG. 5, when a transmitting-message digital-signal is applied to bipolar-pulse generator 20 from input terminal 1 via switches 2 and 3, bipolar pulses (−1 and 1) based on the transmitting-message digital-signal are generated. When the bipolar pulses (−1 and 1) are applied to first coded IDT 22 and second coded IDT 23 via switch 21, respectively, first- and second coded SAWs are excited on first piezoelectric substrate 4. The first coded SAW corresponding to the first coded pattern is detected as a first coded burst-signal at interdigital electrode $A_0$, and after a time corresponding to the distance L, at interdigital electrode $A_1$ again. The first coded burst-signals at interdigital electrodes $A_0$ and $A_1$ form a first double-coded burst-signal composed of a row of four bursts, of which each is made from one burst at interdigital electrode $A_0$ and the previous burst at interdigital electrode $A_1$. In short, the first coded SAW is converted into the first double-coded burst-signal. In the same way, the second coded SAW corresponding to the second coded pattern is converted into a second double-coded burst-signal. The first- and second double-coded burst-signals form a transmitting-message double-coded burst-signal. In other words, the transmitting-message digital-signal is converted into the transmitting-message double-coded burst-signal, which arrives at first amplifier 7 via switch 6, and is emitted from antenna 9 via switch 8 in the same way as FIG. 1.

In the personal receiving section in FIG. 5, if a private double-coded burst-signal is caught at antenna 9, and then, arrives at second amplifier 10 via switch 8 in the same way as FIG. 1, it is applied to right interdigital electrode $B_{-1}$ and left interdigital electrode $B_1$, respectively. In this time, first- and second SAWs are excited on first piezoelectric substrate 4. The first SAW arrives at central interdigital electrode $B_0$ by a time corresponding to the distance L before the second SAW arrives at central interdigital electrode $B_0$. Therefore, one burst wave of the first SAW and the previous burst wave of the second SAW arrive at central interdigital electrode $B_0$ simultaneously. As a result, the private double-coded burst-signal is converted into a private mono-coded burst-signal at central interdigital electrode $B_0$. The private mono-coded burst-signal is applied to second intermediary IDT 16 via switch 11 in the same way as FIG. 1. And then, a private mono-coded SAW along the reverse direction to the personal coded SAW in the personal transmitting section in FIG. 5 is excited on second piezoelectric substrate 14. If the private mono-coded SAW correlates to the personal coded pattern, a private decoded pulse is detected at personal coded IDT 24. Thus, personal coded IDT 24 acts as a call switch. The private decoded pulse is received at signal analyzer 13 via switches 3 and 2.

In the main receiving section in FIG. 5, if a receiving-message double-coded burst-signal, which is composed of rows of double-coded bursts, is caught at antenna 9, it arrives at second amplifier 10 via switch 8 in the same way as FIG. 1, and then, each row of double-coded bursts is applied to right interdigital electrode $B_{-1}$ and left interdigital electrodes $B_1$, respectively. In this time, third- and fourth SAWs are excited on first piezoelectric substrate 4, respectively. The third SAW arrives at central interdigital electrode $B_0$ by a time corresponding to the distance L before the fourth SAW arrives at central interdigital electrode $B_0$. As a result, the row of double-coded bursts is converted into a row of mono-coded bursts at central interdigital electrode $B_0$. When the row of mono-coded bursts is applied to first intermediary IDT 12 via switch 11 in the same way as FIG. 1, a mono-coded SAW along the reverse direction to the first- and second coded SAWs in the main transmitting section in FIG. 5 is excited on first piezoelectric substrate 4. If the mono-coded SAW correlates to the first- and second coded patterns, respectively, first- and second decoded pulses are detected at first coded IDT 22 and second coded IDT 23, respectively. Mixing the first- and second decoded pulses at signal analyzer 13 via switch 21 causes a receiving-message burst-signal. In short, the receiving-message mono-coded burst-signal is converted into the receiving-message burst-signal.

Figure 8:
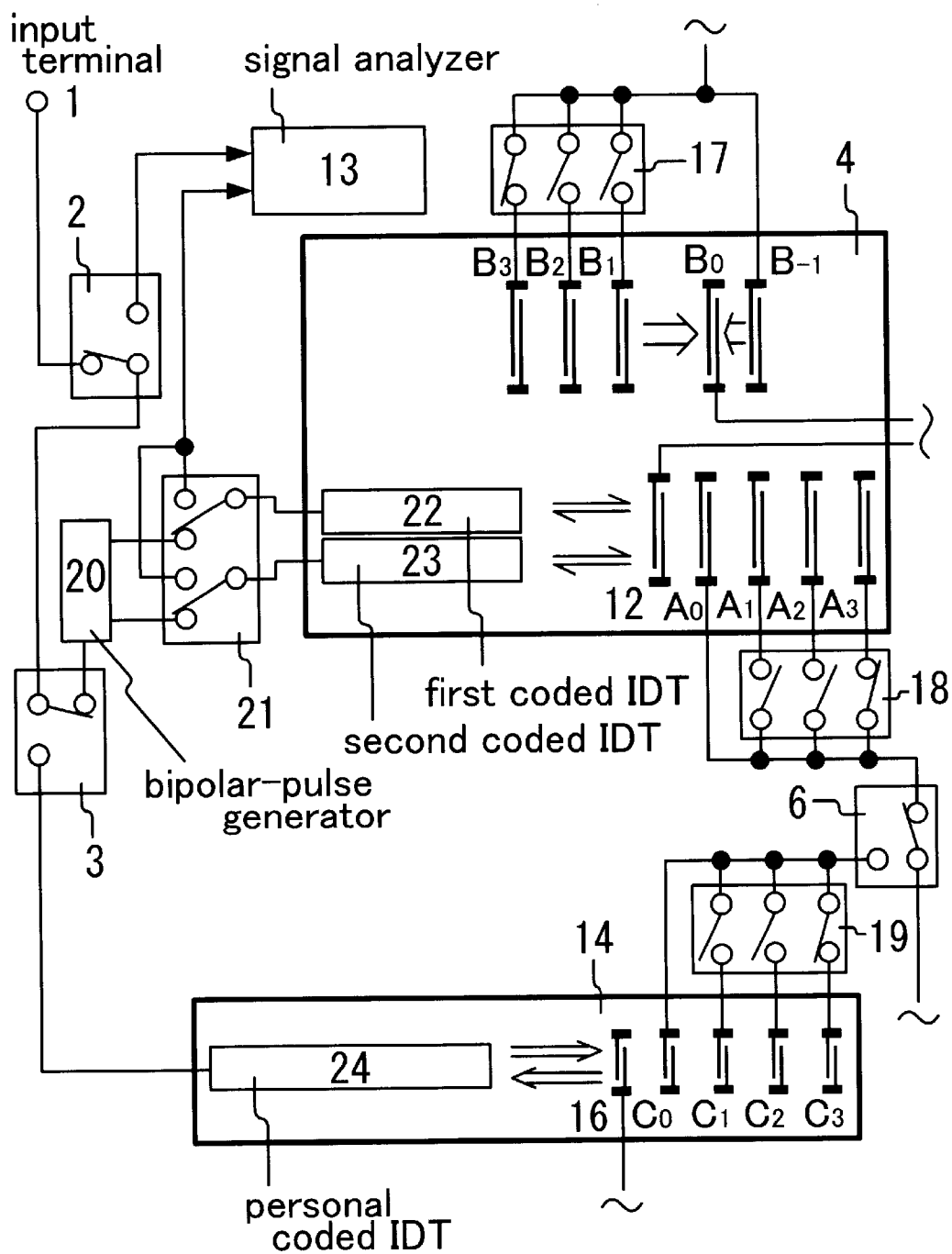
FIG. 8 shows a fragmentary schematic illustration of a coding and decoding system for wireless telecommunication according to a fourth embodiment of the present invention.

FIG. 8 shows a fragmentary schematic illustration of a coding and decoding system for wireless telecommunication according to a fourth embodiment of the present invention. The coding and decoding system for wireless telecommunication in FIG. 8 comprises input terminal 1, switches 2 and 3, first piezoelectric substrate 4, switch 6, first amplifier 7, switch 8, antenna 9, second amplifier 10, switch 11, first intermediary IDT 12, signal analyzer 13, second piezoelectric substrate 14, second intermediary IDT 16, switches 17, 18 and 19, bipolar-pulse generator 20, switch 21, first coded IDT 22, second coded IDT 23, personal coded IDT 24, first-, second-, and third electrode-groups, which are the same as FIG. 4. Amplifier 7, switch 8, antenna 9, second amplifier 10, and switch 11 are not drawn in FIG. 8.

The coding and decoding system for wireless telecommunication in FIG. 8 has four sections, that is, (1) a personal transmitting section composed of input terminal 1, switches 2 and 3, second piezoelectric substrate 14, personal coded IDT 24, the third electrode-group, switches 19 and 6, first amplifier 7, switch 8, and antenna 9; (2) a main transmitting section composed of input terminal 1, switches 2 and 3, bipolar-pulse generator 20, switch 21, first piezoelectric substrate 4, first coded IDT 22, second coded IDT 23, the first electrode-group, switches 18 and 6, first amplifier 7, switch 8, and antenna 9; (3) a personal receiving section composed of antenna 9, switch 8, second amplifier 10, switch 17, first piezoelectric substrate 4, the second electrode-group, switch 11, second piezoelectric substrate 14, second intermediary IDT 16, personal coded IDT 24, switches 3 and 2, and signal analyzer 13; and (4) a main receiving section composed of antenna 9, switch 8, second amplifier 10, switch 17, first piezoelectric substrate 4, the second electrode-group, switch 11, first intermediary IDT 12, first coded IDT 22, second coded IDT 23, switch 21, and signal analyzer 13.

In the personal transmitting section in FIG. 8, when a pulse (1) is applied to personal coded IDT 24 from input terminal 1 via switches 2 and 3, a personal coded SAW corresponding to the personal coded patter of personal coded IDT 24 is excited on second piezoelectric substrate 14. The personal coded SAW is detected as a personal coded burst-signal at interdigital electrode $C_0$, and after a time corresponding to the distance L, 2L and 3L, at interdigital electrodes $C_1$, $C_2$ and $C_3$, respectively. Using switch 19 selects one of interdigital electrodes $C_1$, $C_2$ and $C_3$. Thus, the personal coded burst-signal at interdigital electrodes $C_0$ and that at one of interdigital electrodes $C_1$, $C_2$ and $C_3$ form a personal double-coded burst-signal. The personal double-coded burst-signal arrives at first amplifier 7 via switch 6, and is emitted from antenna 9 via switch 8 in the same way as FIG. 1.

In the main transmitting section in FIG. 8, when a transmitting-message digital-signal is applied to bipolar-pulse generator 20 from input terminal 1 via switches 2 and 3, bipolar pulses (−1 and 1) are generated. When the bipolar pulses (−1 and 1) are applied to first coded IDT 22 and second coded IDT 23 via switch 21, respectively, first- and second coded SAWs are excited on first piezoelectric substrate 4. The first coded SAW corresponding to the first coded pattern is detected as a first coded burst-signal at interdigital electrode $A_0$, and after a time corresponding to the distance L, 2L and 3L, at interdigital electrodes $A_1$, $A_2$ and $A_3$, respectively. Using switch 18 selects one of interdigital electrodes $A_1$, $A_2$ and $A_3$. Thus, the first coded burst-signal at interdigital electrodes $A_0$ and that at one of interdigital electrodes $A_1$, $A_2$ and $A_3$ form a first double-coded burst-signal composed of a row of bursts, of which each is made from an (n)th burst at interdigital electrode $A_0$, and an (n−1)th burst at interdigital electrode $A_1$, or an (n−2)th burst at interdigital electrode $A_2$, or an (n−3)th burst at interdigital electrode $A_3$. In short, the first coded SAW is converted into the first double-coded burst-signal composed of a row of four, five or six bursts in all. In the same way, the second coded SAW corresponding to the second coded pattern is converted into a second double-coded burst-signal composed of a row of four, five or six bursts in all. The first- and second double-coded burst-signals form a transmitting-message double-coded burst-signal. In other words, the transmitting-message digital-signal is converted into the transmitting-message double-coded burst-signal, which arrives at first amplifier 7 via switch 6, and is emitted from antenna 9 via switch 8 in the same way as FIG. 1.

In the personal receiving section in FIG. 8, if a private double-coded burst-signal is caught at antenna 9, and then, arrives at second amplifier 10 via switch 8 in the same way as FIG. 1, it is applied to right interdigital electrode $B_{-1}$ and one of left interdigital electrodes $B_1$, $B_2$ and $B_3$ via switch 17. In this time, a first SAW is excited at right interdigital electrode $B_{-1}$, and a second SAW is excited at one of left interdigital electrodes $B_1$, $B_2$ and $B_3$ on first piezoelectric substrate 4. Central interdigital electrode $B_0$ receives the first SAW, and after a time corresponding to the distance L, 2L or 3L the second SAW. Therefore, at the same time that an (n)th burst wave of the first SAW arrives at central interdigital electrode $B_0$, an (n−1)th burst wave of the second SAW at left interdigital electrode $B_1$, or an (n−2)th burst wave of the second SAW at left interdigital electrode $B_2$, or an (n−3)th burst wave of the second SAW at left interdigital electrode $B_3$ consequently arrives at central interdigital electrode $B_0$. As a result, the private double-coded burst-signal is converted into a private mono-coded burst-signal at central interdigital electrode $B_0$. The private mono-coded burst-signal is applied to second intermediary IDT 16 via switch 11 in the same way as FIG. 1. And then, a private mono-coded SAW along the reverse direction to the personal coded SAW in the personal transmitting section in FIG. 8 is excited on second piezoelectric substrate 14. If the private mono-coded SAW correlates to the personal coded pattern, a private decoded pulse is detected at personal coded IDT 24. Thus, personal coded IDT 24 acts as a call switch. The private decoded pulse is received at signal analyzer 13 via switches 3 and 2.

In the main receiving section in FIG. 8, if a receiving-message double-coded burst-signal, which is composed of rows of double-coded bursts, is caught at antenna 9, it arrives at second amplifier 10 via switch 8 in the same way as FIG. 1, and then, each row of double-coded bursts is applied to right interdigital electrode $B_{-1}$ and one of left interdigital electrodes $B_1$, $B_2$ and $B_3$ via switch 17. In this time, a third SAW is excited at right interdigital electrode $B_{-1}$, and a fourth SAW is excited at one of left interdigital electrodes $B_1$, $B_2$ and $B_3$ on first piezoelectric substrate 4. Central interdigital electrode $B_0$ receives the third SAW, and after a time corresponding to the distance L, 2L or 3L the fourth SAW. Therefore, at the same time that an (n)th burst wave of the third SAW arrives at central interdigital electrode $B_0$, an (n–1)th burst wave of the fourth SAW at left interdigital electrode $B_1$, or an (n–2)th burst wave of the fourth SAW at left interdigital electrode $B_2$, or an (n–3)th burst wave of the fourth SAW at left interdigital electrode $B_3$ consequently arrives at central interdigital electrode $B_0$. As a result, the row of double-coded bursts is converted into a row of mono-coded bursts at central interdigital electrode $B_0$. When the row of mono-coded bursts is applied to first intermediary IDT 12 via switch 11 in the same way as FIG. 1, a mono-coded SAW along the reverse direction to the first- and second coded SAWs in the main transmitting section in FIG. 8 is excited on first piezoelectric substrate 4. If the mono-coded SAW correlates to the first- and second coded patterns, respectively, first- and second decoded pulses are detected at first coded IDT 22 and second coded IDT 23, respectively. Mixing the first- and second decoded pulses at signal analyzer 13 via switch 21 causes a receiving-message burst-signal. In short, the receiving-message mono-coded burst-signal is converted into the receiving-message burst-signal.

Using the coding and decoding system for wireless telecommunication in FIG. 1, 4, 5 or 8 causes a network communication secret, so that makes it possible to transmit and receive passwords, and recognize the personal-card singularity in secret.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:
1. A coding and decoding system for wireless telecommunication comprising:
  a wireless telecommunication device consisting of
    a first piezoelectric substrate,
    a coded IDT consisting of interdigital electrode pairs $P_i$ (i=1, 2, ..., n), of which two neighbors are at a distance L from each other, and having a coded pattern,
    a first electrode-group consisting of an interdigital electrode $A_0$ and an interdigital electrode $A_i$ (i=1) at a distance iL (i=1) from said interdigital electrode $A_0$,
    a first amplifier,
    an antenna,
    a second amplifier,
    a second electrode-group consisting of a central interdigital electrode $B_0$, a right interdigital electrode $B_{-1}$ at a distance $L_0$ from said central interdigital electrode $B_0$, and a left interdigital electrode $B_i$ (i=1) at a distance $L_0+iL$ (i=1) from said central interdigital electrode $B_0$,
    a first intermediary IDT,
    a signal analyzer; and
  a personal card consisting of
    a second piezoelectric substrate,
    a personal coded IDT including said interdigital electrode pairs $P_i$, and having a personal coded pattern,
    a third electrode-group consisting of an interdigital electrode $C_0$ and an interdigital electrode $C_i$ (i=1) at said distance iL (i=1) from said interdigital electrode $C_0$, and
    a second intermediary IDT,
      said second piezoelectric substrate, said personal coded IDT, said third electrode-group, said first amplifier, and said antenna constructing a personal transmitting section, in which
        said personal coded IDT receiving a pulse, and exciting a personal coded SAW on said second piezoelectric substrate,
        said interdigital electrode $C_0$ detecting a personal coded burst-signal corresponding to said personal coded pattern,
        said interdigital electrode $C_i$ detecting said personal coded burst-signal after a time corresponding to said distance iL, said personal coded burst-signals at said interdigital electrodes $C_0$ and $C_i$ forming a personal double-coded burst-signal,
        said antenna emitting said personal double-coded burst-signal via said first amplifier;
      said first piezoelectric substrate, said coded IDT, said first electrode-group, said first amplifier, and said antenna constructing a main transmitting section, in which
        said coded IDT receiving a transmitting-message digital-signal, and exciting a coded SAW on said first piezoelectric substrate,
        said interdigital electrode $A_0$ detecting a coded burst-signal corresponding to said coded pattern of said input coded IDT,
        said interdigital electrode $A_i$ detecting said coded burst-signal after a time corresponding to said distance iL, said coded burst-signals at said interdigital electrodes $A_0$ and $A_i$ forming a double-coded burst-signal,
        said antenna emitting said double-coded burst-signal via said first amplifier;

said antenna, said second amplifier, said first piezoelectric substrate, said second electrode-group, said second piezoelectric substrate, said second intermediary IDT, said personal coded IDT, and said signal analyzer constructing a personal receiving section, in which said antenna receiving a private double-coded burst-signal, said right interdigital electrode $B_{-1}$ and said left interdigital electrode $B_i$ receiving said private double-coded burst-signal via said second amplifier, respectively, and exciting first- and second SAWs on said first piezoelectric substrate, respectively, said central interdigital electrode $B_0$ detecting a private mono-coded burst-signal made from said first- and second SAWs, said second intermediary IDT receiving said private mono-coded burst-signal, and exciting a private mono-coded SAW along the reverse direction to said personal coded SAW on said second piezoelectric substrate, said personal coded IDT detecting a private decoded pulse if said private mono-coded SAW correlates to said personal coded pattern, said signal analyzer receiving said private decoded pulse;

said antenna, said second amplifier, said first piezoelectric substrate, said second electrode-group, said first intermediary IDT, said coded IDT, and said signal analyzer constructing a main receiving section, in which said antenna receiving a receiving-message double-coded burst-signal, said right interdigital electrode $B_{-1}$ and said left interdigital electrode $B_i$ receiving said receiving-message double-coded burst-signal via said second amplifier, respectively, and exciting third- and fourth SAWs on said first piezoelectric substrate, respectively, said central interdigital electrode $B_0$ detecting a mono-coded burst-signal made from said third- and fourth SAWs, said first intermediary IDT receiving said mono-coded burst-signal, and exciting a mono-coded SAW along the reverse direction to said coded SAW on said first piezoelectric substrate, said coded IDT detecting a decoded pulse if said mono-coded SAW correlates to said coded pattern, said signal analyzer receiving said decoded pulse.

2. A coding and decoding system for wireless telecommunication as defined in claim 1, wherein said coded IDT consists of at least three interdigital electrode pairs.

3. A coding and decoding system for wireless telecommunication as defined in claim 1, wherein said personal coded IDT comprises a row of multiple times four blocks, of which at least one has the same construction as said coded IDT and all the others have no-electrode-pair constructions with the same outward size as said coded IDT.

4. A coding and decoding system for wireless telecommunication as defined in claim 1, wherein said first electrode-group includes at least two interdigital electrodes $A_i$ {i=1, 2, ..., (n-1)} at a distance iL {i=1, 2, ..., (n-1)}, respectively, from said interdigital electrode $A_0$, said second electrode-group includes at least two left interdigital electrodes $B_i$ {i=1, 2, ..., (n-1)} at a distance $L_0$+iL {i=1, 2, ..., (n-1)}, respectively, from said central interdigital electrode $B_0$, and said third electrode-group includes at least two interdigital electrodes $C_i$ {i=1, 2, ..., (n-1)} at a distance iL {i=1, 2, ..., (n-1)}, respectively, from said interdigital electrode $C_0$.

5. A coding and decoding system for wireless telecommunication comprising:

a wireless telecommunication device consisting of
a first piezoelectric substrate,
a bipolar-pulse generator
a first coded IDT consisting of interdigital electrode pairs $P_i$ (i=1, 2, ..., n), of which two neighbors are at a distance L from each other, and having a first coded pattern,
a second coded IDT consisting of interdigital electrode pairs $P_i$ (i=1, 2, ..., n), of which two neighbors are at a distance L from each other, and having a second coded pattern,
a first electrode-group consisting of an interdigital electrode $A_0$ and an interdigital electrode $A_i$ (i=1) at a distance iL (i=1) from said interdigital electrode $A_0$,
a first amplifier,
an antenna,
a second amplifier,
a second electrode-group consisting of a central interdigital electrode $B_0$, a right interdigital electrode $B_{-1}$ at a distance $L_0$ from said central interdigital electrode $B_0$, and a left interdigital electrode $B_i$ (i=1) at a distance $L_0$+iL (i=1) from said central interdigital electrode $B_0$,
a first intermediary IDT,
a signal analyzer; and
a personal card consisting of
a second piezoelectric substrate,
a personal coded IDT consisting of said interdigital electrode pairs $P_i$ (i=1, 2, ..., n), and having a personal coded pattern,
a third electrode-group consisting of an interdigital electrode $C_0$ and an interdigital electrode $C_i$ (i=1) at said distance iL (i=1) from said interdigital electrode $C_0$, and
a second intermediary IDT,
said second piezoelectric substrate, said personal coded IDT, said third electrode-group, said first amplifier, and said antenna constructing a personal transmitting section, in which said personal coded IDT receiving a pulse, and exciting a personal coded SAW on said second piezoelectric substrate, said interdigital electrode $C_0$ detecting a personal coded burst-signal corresponding to said personal coded pattern, said interdigital electrode $C_i$ detecting said personal coded burst-signal after a time corresponding to said distance iL, said personal coded burst-signals at said interdigital electrodes $C_0$ and $C_i$ forming a personal double-coded burst-signal, said antenna emitting said personal double-coded burst-signal via said first amplifier;

said first piezoelectric substrate, said bipolar-pulse generator, said first- and second coded IDTs, said first electrode-group, said first amplifier, and said antenna constructing a main transmitting section, in which said bipolar-pulse generator generating bipolar pulses (−1 and 1) that form a transmitting-message digital-signal, said first- and second coded IDTs receiving said bipolar pulses (−1 and 1), and exciting first- and second coded SAWs on said first piezoelectric substrate, respectively, said interdigital electrode $A_0$ detecting a coded burst-signal corresponding to said first- and second coded pattern, respectively, said interdigital electrode $A_i$ detecting said coded burst-signal after a time corresponding to said distance iL, said coded burst-signals at said interdigital electrodes $A_0$ and $A_i$ forming a double-coded burst-signal, said antenna emitting said double-coded burst-signal via said first amplifier;

said antenna, said second amplifier, said first piezoelectric substrate, said second electrode-group, said second piezoelectric substrate, said second intermediary IDT, said personal coded IDT, and said signal analyzer constructing a personal receiving section, in which said antenna receiving a private double-coded burst-signal, said right interdigital electrode $B_{-1}$ and said left interdigital electrode $B_i$ receiving said private double-coded burst-signal via said second amplifier, respectively, and exciting first- and second SAWs on said first piezoelectric substrate, respectively, said central interdigital electrode $B_0$ detecting a private mono-coded burst-signal made from said first- and second SAWs, said second intermediary IDT receiving said private mono-coded burst-signal, and exciting a private mono-coded SAW along the reverse direction to said personal coded SAW on said second piezoelectric substrate, said personal coded IDT detecting a private decoded pulse if said private mono-coded SAW correlates to said personal coded pattern, said signal analyzer receiving said private decoded pulse;

said antenna, said second amplifier, said first piezoelectric substrate, said second electrode-group, said first intermediary IDT, said first- and second coded IDTs, and said signal analyzer constructing a main receiving section, in which said antenna receiving a receiving-message double-coded burst-signal, said right interdigital electrode $B_{-1}$ and said left interdigital electrode $B_i$ receiving said receiving-message double-coded burst-signal via said second amplifier, respectively, and exciting third- and fourth SAWs on said first piezoelectric substrate, respectively, said central interdigital electrode $B_0$ detecting a mono-coded burst-signal made from said third- and fourth SAWs, said first intermediary IDT receiving said mono-coded burst-signal, and exciting a mono-coded SAW along the reverse direction to said first- and second coded SAWs on said first piezoelectric substrate, said first- and second coded IDTs detecting first- and second decoded pulses if said mono-coded SAW correlates to said first- and second coded patterns, respectively, said signal analyzer receiving said first- and second decoded pulses.

6. A coding and decoding system for wireless telecommunication as defined in claim 5, wherein said first- and second coded IDTs consist of at least three interdigital electrode pairs, respectively.

7. A coding and decoding system for wireless telecommunication as defined in claim 5, wherein said personal coded IDT comprises a row of multiple times four blocks, of which each has the same construction as one of said first- and second coded IDTs.

8. A coding and decoding system for wireless telecommunication as defined in claim 5, wherein said first electrode-group includes at least two interdigital electrodes $A_i$ {i=1, 2, ..., (n−1)} at a distance iL {i=1, 2, ..., (n−1)}, respectively, from said interdigital electrode $A_0$, said second electrode-group includes at least two left interdigital electrodes $B_i$ {i=1, 2, ..., (n−1)} at a distance $L_0$+iL {i=1, 2, ..., (n−1)}, respectively, from said central interdigital electrode $B_0$, and said third electrode-group includes at least two interdigital electrodes $C_i$ {i=1, 2, ..., (n−1)} at a distance iL {i=1, 2, ..., (n−1)}, respectively, from said interdigital electrode $C_0$.

* * * * *